Nov. 11, 1952     R. H. MAGUIRE     2,617,679
VEHICLE BODY BELT MOLDING CONSTRUCTION
Filed Sept. 21, 1951

R. H. MAGUIRE
INVENTOR.

BY E. C. McRae
J. R. Faulkner
J. H. Oster

ATTORNEYS

Patented Nov. 11, 1952

2,617,679

UNITED STATES PATENT OFFICE 2,617,679

VEHICLE BODY BELT MOLDING CONSTRUCTION

Robert H. Maguire, Birmingham, Mich., assignor to Ford Motor Company, Dearborn, Mich., a corporation of Delaware Application September 21, 1951, Serial No. 247,583

3 Claims. (Cl. 296—49.2)

This invention relates generally to motor vehicle bodies, and particularly to a molding therefor and the mounting thereof upon the vehicle body.

It has been customary in motor vehicle construction to provide various metal moldings, usually chrome plated, to enhance the appearance and styling of the vehicle and in some instances to conceal certain structural components. Among such moldings are the so-called belt moldings extending horizontally along the doors and the body on each side thereof immediately below the window openings. The present invention provides a molding of different character particularly adapted for use as a belt molding, but also suitable for other body locations. The molding of the present invention may be made of vinyl or other plastic material and is preferably preformed to a predetermined cross-sectional shape designed to conform to the contour of the body at the belt line and also to provide for attachment of the molding to the body in an effective yet simple manner. As a belt molding, the molding has a concave portion corresponding in shape to the adjacent body panel, a return bent marginal flange integrally formed at one edge of the molding and engaging and secured to the adjacent return bent marginal flange of the body panel defining one side of the window opening, and an integral flange at the opposite edge of the molding offset inwardly from its concave portion to engage the outer surface of the body panel and to be secured thereto by means of a separate metal molding of narrow cross-section. A strip of resilient material such as sponge rubber is cemented to the inner surface of the concave portion of the molding to form a cushion therefor between the plastic molding and the body panel. Among other advantages, the construction of the present invention permits new and attractive styling effects to be obtained. In addition, the resiliently backed plastic molding not only provides a durable and easily cleaned molding of different texture and appearance but it also provides a pleasantly soft surface when the door is grasped in this region during opening and closing thereof. Furthermore, the plastic molding may be furnished in various colors and textures.

Other objects and advantages of this invention will be made more apparent as this description proceeds, particularly when considered in connection with the accompanying drawings, wherein.

Figure 1:
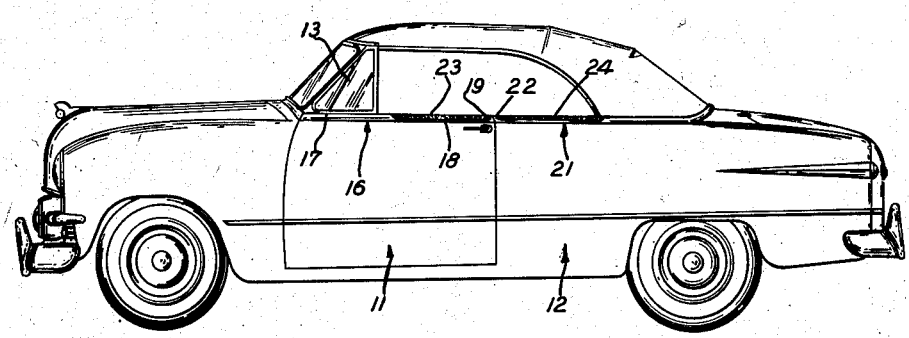
Figure 1 is a side elevational view of a motor vehicle of the convertible type incorporating the present invention.

Referring now to the drawings, and particularly to Figure 1, there is shown a motor vehicle of the convertible type having a door 11 and a side body panel 12 rearwardly of the door. The door 11 carries a swinging ventilating window 13 and a conventional vertically slidable window 14 (Figure 3), while a conventional pivoted quarter window (not shown) is provided rearwardly of the door and swings out of view into the space provided behind the body panel 12.

Mounted upon the door 11 at the belt line thereof, and secured thereto by conventional means such as concealed retaining clips (not shown), is a chrome plated belt molding 16. The metal molding 16 extends the entire width of the door 11 from the hinge side thereof to the opposite side. The forward portion 17 of the molding 16 is of conventional shape and width and extends from the hinge side of the door to an intermediate portion thereof. Rearwardly thereof, the molding 16 is reduced in width to form a narrow portion 18 forming a continuation of the lower part of the forward portions 17 of the molding. Adjacent the rearward edge of the door 11 the metal molding 16 is formed with a narrow upwardly extending integral flange 19. A second chrome plated metal molding 21 is provided along the belt line of the body panel 12 rearwardly of the door 11 and in the present instance is shown as being of relatively narrow width at its forward end with a narrow upwardly extending flange 22 at its forward edge. Vertically above the narrow portions of the moldings 16 and 21 plastic moldings 23 and 24 are positioned, as shown in Figure 1.

Figure 2:
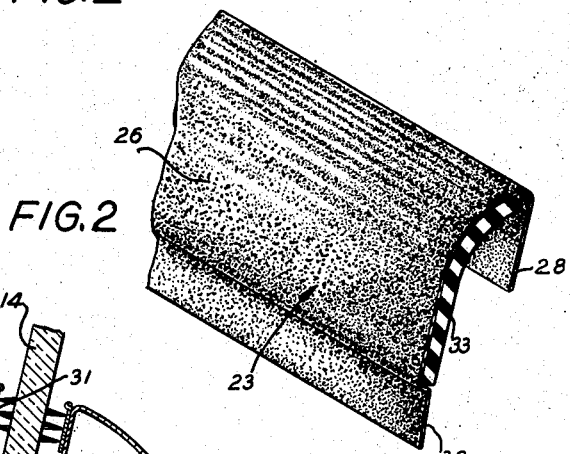
Figure 2 is an enlarged perspective view of the molding shown in Figure 1, partly broken away and in section.

Figure 2 shows in perspective a typical portion of the front plastic molding 23. The molding 24 is similar. With reference to Figure 2, and also to Figure 3 which shows in cross-section the plastic molding 23 and the metal molding 16 applied to the vehicle door, it will be seen that the plastic molding 23 has a body portion 26 of concave shape corresponding generally in shape to the adjacent concave portion 27 of the outer door panel 11. At its upper edge the concave portion 26 of the plastic molding is formed with an integral return bent marginal flange 28 adapted to extend downwardly in juxtaposition to the inner surface of the marginal flange 29 of the door panel 11. The marginal flange 28 of the plastic molding is suitably secured to the marginal flange 29 of the door panel by being cemented thereto, or by other suitable means. A glass run strip 31 of conventional construction is secured to the face of the marginal flange 28 to form a guide for one side of the door window 14 as in conventional practice.

Figure 3:
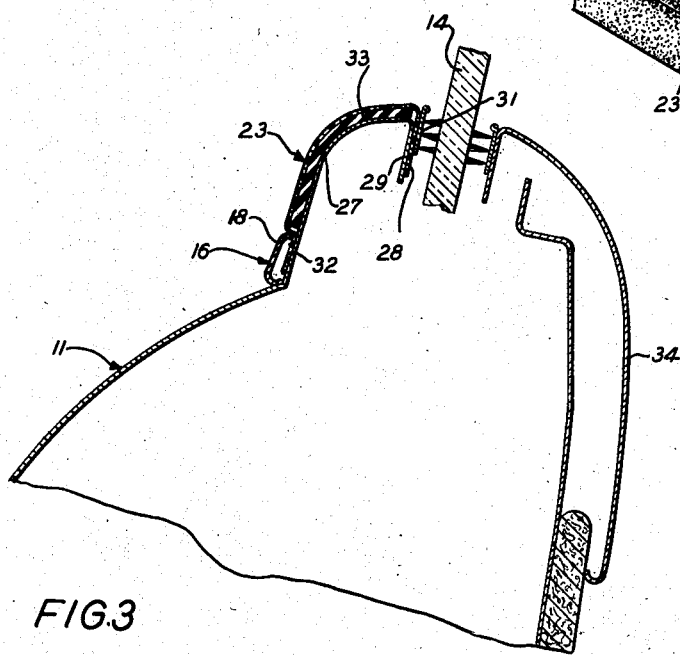
Figure 3 is an enlarged transverse cross-sectional view through the vehicle door, taken on the plane indicated by the line 3—3 of Figure 1.

At its lower edge the vinyl molding 23 is formed with an integral flange 32 offset inwardly from the concave portion 26 of the molding and adapted to engage the adjacent outer surface of the door panel 11. A resilient padding strip 33, formed of sponge rubber or other suitable material, is cemented to the inner surface of the concave portion 26 of the plastic molding 23, and extends from the marginal flange 28 to the offset flange 32 of the molding. As best seen in Figure 3, the inner surface of the resilient padding strip 33 corresponds in shape to the shape of the upper portion 27 of the door panel 11.

The narrow rearward part 18 of the chrome plated metal molding 16 overlaps the lower offset marginal flange 32 of the plastic molding 23 to securely clamp the latter against the door panel. If desired the offset flange 32 could be cemented or otherwise attached directly to the door panel in addition to being held thereon by the metal molding. It will be noted from Figure 3 that the narrow portion 18 of the narrow molding 16, when seated against the offset flange 32 of the plastic molding, forms a continuation of the outer surface of the portion 26 of the plastic molding to present a pleasing appearance. The plastic molding 23 for the door is of such length as to be overlapped at its forward and rearward edges by the wider portion 17 and by the rearward flange 19 of the metal molding respectively.

The plastic molding 23 may advantageously be formed of vinyl although other materials may also be satisfactory. The molding is preformed to the shape shown in the drawings to enable it to be uniform in appearance and to be readily and inexpensively assembled in production to the vehicle body. Its outer surface may be smooth, or it may be formed with a pebbled grain or with other textures. It is durable, easily cleaned, and may be provided in various colors to match or blend with the body colors. In addition, it has a soft warm feel to the touch, as contrasted to the cold feeling of the usual chrome plated molding, and forms a desirable construction particularly for custom bodies.

The plastic molding 24 at the belt line of the body panel 12 is similar in construction to the molding 23 and is similarly held in place by a metal molding 21.

The invention contemplates the provision of moldings of the type described above of material other than vinyl plastic, and provided either with or without a resilient backing strip. The molding of course may be of various shapes to conform and be applied to particular body panels, and it is furthermore suitable for use in locations other than at the vehicle belt line. If desired, a similar molding may be applied to the inner surfaces of door and body opposite the belt moldings 23 and 24 so as to provide a harmonious appearance. In the construction shown in Figure 3 the plastic molding could of course be applied to the inner garnish molding 34, or the latter could be trimmed with a leather or fabric material, if desired, since it is located inside the vehicle.

It will be understood that the invention is not to be limited to the exact construction shown and described, but that various changes and modifications may be made without departing from the spirit and scope of the invention, as defined in the appended claims.

What is claimed is:

1. In a vehicle body construction, an outer body panel having a concave portion adjacent its upper edge continuing into a return bent downwardly extending flat marginal flange defining one side of a window opening, a preformed plastic molding for the upper edge of said outer body panel, said molding having a concave portion corresponding in shape to the concave portion of said body panel, a return bent flat marginal flange integrally formed at one edge of said molding and engaging the return bent marginal flange of the outer body panel and secured thereto, an integral flange at the opposite edge of said molding offset inwardly from the concave portion of the molding and engaging the outer surface of said outer body panel, a strip of resilient material secured to the inner surface of the concave portion of said molding to form a cushion therefor, and a metal molding mounted upon the outer surface of said outer body panel and overlapping the offset flange of said plastic molding to hold the latter against said outer body panel.

2. The structure defined by claim 1 which is further characterized in that said body panel is a vehicle door panel and said metal molding extends the entire width of said door panel from the hinge side of the door to the opposite side thereof, said metal molding being of uniform width from the hinge side of the door to an intermediate portion thereof and substantially reduced in width for the remainder of its length to form a narrow flange below said plastic molding overlapping the lower offset flange of said plastic molding, said plastic molding corresponding in length generally to the length of the narrow portion of said metal molding and being arranged in longitudinal alignment with the wide portion of said metal molding.

3. In a vehicle body construction, inner and outer laterally spaced body panels each having a concave portion adjacent its upper edge continuing into a a return bent downwardly extending flat marginal flange, said flanges facing each other and spaced apart to define an opening therebetween for a sliding window panel, window guiding strips mounted upon said marginal flanges and engaging opposite sides of the window, a preformed plastic molding for the upper edge of said outer body panel, said molding having a concave portion corresponding in shape to the concave portion of said body panel, a return bent flat marginal flange integrally formed at the upper edge of said molding and positioned between the return bent marginal flange of said outer body panel and the window guiding strip mounted thereon, an integral flange at the opposite edge of said molding offset inwardly from the concave portion of the molding and engaging the outer surface of said outer body panel, a strip of resilient material secured to the inner surface of the concave portion of said molding to form a cushion therefor, and a metal molding mounted upon the outer surface of said outer body panel and overlapping the offset flange of said plastic molding to hold the latter against said outer body panel.

ROBERT H. MAGUIRE.

REFERENCES CITED

The following references are of record in the file of this patent:

UNITED STATES PATENTS

| Number | Name | Date |
|---|---|---|
| 1,259,798 | Stanwood | Mar. 19, 1918 |
| 2,383,575 | Wernig | Aug. 28, 1945 |
| 2,504,234 | Strickland | Apr. 18, 1950 |
| 2,586,631 | Esch | Feb. 19, 1952 |